United States Patent
Cho et al.

(10) Patent No.: US 10,306,185 B2
(45) Date of Patent: May 28, 2019

(54) NETWORK SECURITY SYSTEM AND METHOD THEREOF

(71) Applicant: HANWHA TECHWIN CO., LTD., Changwon-si (KR)

(72) Inventors: Sung Bong Cho, Changwon-si (KR); Jae Young Shin, Changwon-si (KR); Hyun Ho Kim, Changwon-si (KR); Kyung Duk Kim, Changwon-si (KR); Jeong Koo Kang, Changwon-si (KR); Myung Hwa Son, Changwon-si (KR); Hae Yoon Hong, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 212 days.

(21) Appl. No.: 14/458,385

(22) Filed: Aug. 13, 2014

(65) Prior Publication Data
US 2015/0288930 A1    Oct. 8, 2015

(30) Foreign Application Priority Data

Apr. 8, 2014   (KR) .................. 10-2014-0042026

(51) Int. Cl.
*H04N 7/00* (2011.01)
*H04N 7/18* (2006.01)

(52) U.S. Cl.
CPC .................. *H04N 7/181* (2013.01)

(58) Field of Classification Search
CPC ...................................... H04N 7/181
USPC ......................................... 348/143
See application file for complete search history.

(56) References Cited

U.S. PATENT DOCUMENTS

| | | | | | |
|---|---|---|---|---|---|
| 5,684,957 | A | * | 11/1997 | Kondo | G06F 21/552 709/225 |
| 7,623,152 | B1 | * | 11/2009 | Kaplinsky | G06T 7/254 348/155 |
| 7,839,926 | B1 | * | 11/2010 | Metzger | H04N 5/144 375/240.01 |
| 8,482,609 | B1 | * | 7/2013 | Mishra | H04N 7/181 348/143 |

(Continued)

FOREIGN PATENT DOCUMENTS

| | | | |
|---|---|---|---|
| JP | 2009260552 A | * | 11/2009 |
| JP | 2009260552 A | * | 11/2009 |

(Continued)

*Primary Examiner* — Tsion B Owens
*Assistant Examiner* — Shanika M Brumfield
(74) *Attorney, Agent, or Firm* — Sughrue Mion, PLLC

(57) ABSTRACT

Provided is a network security system including: a spatial information collector configured to acquire, from a manager input terminal, spatial information; a device position receiver configured to receive, from the manager terminal, at least one device installation position with respect to the spatial information and storing the at least one device installation position; a device recommender configured to provide a candidate device list corresponding to the at least one device installation position; a device determiner configured to receive a signal for selecting at least one device from the candidate device list, and determine a model of the at least one selected device to be installed at the at least one device installation position; and a device setter configured to set a setting of the at least one selected device.

22 Claims, 5 Drawing Sheets

(56) References Cited

U.S. PATENT DOCUMENTS

| | | | |
|---|---|---|---|
| 8,548,978 B2* | 10/2013 | Lynn | G06F 17/30876 707/710 |
| 8,817,102 B2* | 8/2014 | Saeki | G08B 13/19613 348/154 |
| 9,898,921 B2* | 2/2018 | Shapiro | G08B 21/02 |
| 2002/0161740 A1* | 10/2002 | Nakamura | G06F 3/1204 |
| 2003/0206231 A1* | 11/2003 | Chen | H04N 1/00137 348/207.99 |
| 2003/0217051 A1* | 11/2003 | Uchiyama | G06F 17/30663 |
| 2004/0017929 A1* | 1/2004 | Bramblet | G07C 9/00 382/103 |
| 2004/0098471 A1* | 5/2004 | Shima | H04L 29/12009 709/221 |
| 2004/0156530 A1* | 8/2004 | Brodsky | G06K 9/32 382/103 |
| 2007/0162397 A1* | 7/2007 | Nasukawa | G06Q 30/02 705/54 |
| 2007/0279214 A1* | 12/2007 | Buehler | G08B 13/19615 340/521 |
| 2007/0282665 A1* | 12/2007 | Buehler | G06Q 30/02 705/7.29 |
| 2008/0155047 A1* | 6/2008 | Chuang | H04L 41/0806 709/208 |
| 2008/0284848 A1* | 11/2008 | Martin | F41H 11/02 348/143 |
| 2009/0123135 A1* | 5/2009 | Amling | H04N 5/232 386/248 |
| 2010/0118153 A1* | 5/2010 | Yu | H04N 5/23203 348/207.11 |
| 2010/0118169 A1* | 5/2010 | Yu | H04N 5/23203 348/294 |
| 2011/0087559 A1* | 4/2011 | Paul | G06Q 30/0635 705/26.81 |
| 2011/0149041 A1* | 6/2011 | Eccles | H04N 17/002 348/46 |
| 2011/0279640 A1* | 11/2011 | Choi | H04N 7/148 348/14.12 |
| 2011/0317016 A1* | 12/2011 | Saeki | G08B 13/19613 348/154 |
| 2013/0050517 A1* | 2/2013 | Fan | G06K 9/00 348/208.99 |
| 2017/0048449 A1* | 2/2017 | Chen | H04N 5/23216 |

FOREIGN PATENT DOCUMENTS

| | | | |
|---|---|---|---|
| JP | 2012-15795 A | | 1/2012 |
| JP | 2012109787 A | * | 6/2012 |
| JP | 2012109787 A | * | 6/2012 |
| KR | 10-2006-0018405 A | | 3/2006 |
| KR | 100670816 B1 | * | 1/2007 |
| KR | 10-2009-0037741 A | | 4/2009 |

* cited by examiner

NETWORK SECURITY SYSTEM AND METHOD THEREOF

CROSS-REFERENCE TO RELATED APPLICATIONS

This application claims priority from Korean Patent Application No. 10-2014-0042026, filed on Apr. 8, 2014, in the Korean Intellectual Property Office, the disclosure of which is incorporated herein in its entirety by reference.

BACKGROUND

1. Field

Apparatuses and methods consistent with exemplary embodiments relate to a network security system and a method thereof, and more particularly, to a network security system capable of efficiently completing the installation of devices necessary for a large network security space.

2. Description of the Related Art

Camera systems of the related art include systems that capture an image by using an analog camera, record the image by using a recording device such as a video cassette recorder (VCR), and then send the recorded image to a display device such as a monitor. With the gradual development of the camera systems, VCRs have been replaced with digital video recorders (DVRs) and analog cameras has been replaced with Internet protocol (IP) cameras. Due to the development of camera systems, the number of devices capable of being connected to one camera system has rapidly increased. For example, in a camera system of the related art, which is constituted by an analog camera-VCR-monitoring device, only a small number of cameras are registered on a network. However, in a recent camera system of the related art, several tens of or several hundreds of IP cameras may be registered on a network.

When the above-described camera system is used for a monitoring system, a display device capable of monitoring an image in real time, a central monitoring system (CMS) capable of receiving, retrieving, and reproducing an image in real time, an entrance control device connected via a network, and a network switch/hub device for connecting individual devices, in addition to an IP camera that captures an image and a network video recorder (NVR) that receives and records an image, may be connected to each other.

In such a camera system, a large amount of time and manpower are required to individually configure and register devices. In camera systems, systems from a small system of one to four channels to a large system of 64 or more channels may be connected in a hierarchical manner. In the case of a small system, a separate storage device is not provided, and an image may be stored in a memory included in a camera. On the other hand, in the case of a large system, a complex storage method having a multiple storage structure may be used. Accordingly, it is important to appropriately register and configure various devices in various environments.

SUMMARY

One or more exemplary embodiments may include a network security system of which a design time is reduced.

One or more exemplary embodiments may also include a network security system capable of providing information about a camera which is installable at a specific position and automatically completing a setting of an image profile on a camera when the corresponding camera is selected.

One or more exemplary embodiments may include a network security system that automatically completes settings of devices used in the network security system.

Additional aspects will be set forth in part in the description which follows and, in part, will be apparent from the description, or may be learned by practice of the exemplary embodiments.

According to an aspect of an exemplary embodiment, there is provided a network security system including: a spatial information collector configured to acquire, from a manager terminal, spatial information about a space where the network security system is to be installed; a device position receiver configured to receive, from the manager terminal, at least one device installation position with respect to the spatial information, and store the at least one device installation position; a device recommender configured to provide a candidate device list corresponding to the at least one device installation position; a device determiner configured to receive a signal for selecting at least one device from the candidate device list, and determine a model of the at least one selected device to be installed at the at least one device installation position; and a device setter configured to set a setting of the at least one selected device.

The at least one selected device may be a camera, and the device setter may be further configured to automatically set an image profile setting of the camera.

The at least one device may be one of a recorder, a monitoring device, and a central management device, and the at least one device installation position may include a connection relationship between devices.

The candidate device list may include all models of corresponding devices that are stored in a database.

The device setter may be further configured to set at least one of an image profile, capacity, bandwidth, and network.

In response to the at least one device being a camera, the device setter may be further configured to set the image profile by setting a resolution, a bitrate, and a frame rate of the camera.

In response to the at least one device being a recorder or a monitoring device, the device setter may be further configured to set the capacity by setting the number of hard disks and capacity of the recorder or the monitoring device.

In response to the at least one device being a network, the device setter may be further configured to set a dynamic host configuration protocol (DHCP), a static Internet protocol (IP), and a dynamic domain name service (DDNS) of the network.

In response to the at least one device being a network or a network switch, the device setter may be further configured to set the bandwidth between devices connected to each other.

The device recommender may be further configured to provide the candidate device list in descending order of a degree of matching.

The device setter may be further configured to change a setting of the at least one device based on an input from the manager terminal.

At least two device installation positions may be present with respect to at least one device which has at least one model.

According to an aspect of another exemplary embodiment, there is provided a network security method including: acquiring, from a manager terminal, spatial information about a space where a network security system is to be installed; receiving, from the manger terminal, a device installation position with respect to the spatial information, and storing the device installation position; providing a candidate device list corresponding to the device installation position; receiving a signal for selecting a device from the candidate device list and determining a model of the selected device to be installed at the device installation position; and automatically setting a setting of the selected device.

The selected device may be a camera, and the automatically setting the setting of the selected device may include automatically setting an image profile setting of the camera.

The selected device may be one of a recorder, a monitoring device, and a central management device, and the device installation position may include a connection relationship between devices.

Accordingly to an aspect of another exemplary embodiment, there is provided a non-transitory computer readable medium having recorded thereon a program, which when executed by a computer, causes the computer to perform a method including: acquiring spatial information corresponding to a space where a security system is to be installed; receiving at least one device installation position within the space and storing the device installation position; providing a candidate device list corresponding to the at least one device installation position; receiving a signal for selecting, from the candidate device list, at least one device to be installed at the at least one device installation position; and configuring at least one setting of the at least one selected device.

The at least one selected device may be a camera, and the at least one setting of the camera may be an image profile setting including at least one of a resolution, a bitrate, and a frame rate of the camera.

The at least one selected device may be one of a recorder, a monitoring device, and a central management device, and wherein the at least one device installation position includes a connection relationship between devices in the security system.

The candidate device list may include a plurality of devices arranged in descending order based on a suitability for the at least one device installation position.

The spatial information may include a floor plan of the space where the security system is to be installed.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION OF EXEMPLARY EMBODIMENTS

Figure 1:
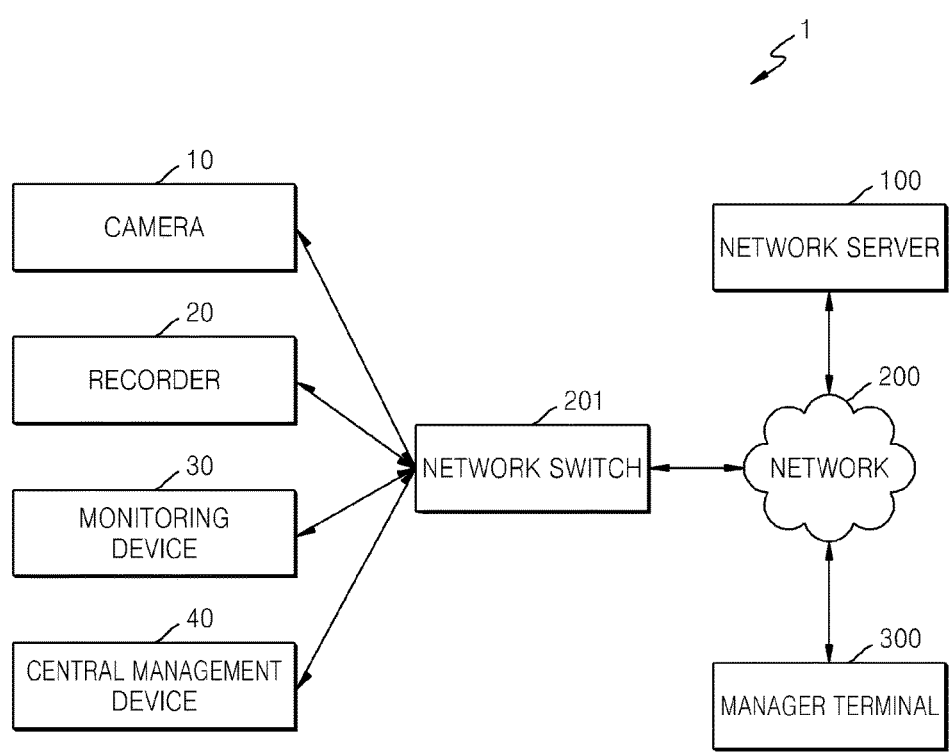
FIG. 1 is a diagram showing a network security system according to an exemplary embodiment.

Certain exemplary embodiments will now be described more fully with reference to the accompanying drawings. The exemplary embodiments will be described in detail such that one of ordinary skill in the art may easily implement the exemplary embodiments. It should be understood that the exemplary embodiments may vary but do not have to be mutually exclusive. For example, particular shapes, structures, and properties according to an exemplary embodiment described in this specification may be modified in other exemplary embodiments without departing from the spirit and scope of the exemplary embodiments. In addition, positions or arrangement of individual components of each of the exemplary embodiments may also be modified without departing from the spirit and scope of the exemplary embodiments. Accordingly, the detailed description below should not be construed as having limited meanings but construed to encompass the scope of the exemplary embodiments, as defined by the appended claims and any equivalent ranges thereto. In the drawings, like reference numerals denote like elements in various aspects.

Hereinafter, the certain exemplary embodiments will now be described more fully with reference to the accompanying drawings, such that one of ordinary skill in the art may easily implement the exemplary embodiments.

FIG. 1 is a diagram showing a network security system 1 according to an exemplary embodiment.

Referring to FIG. 1, the network security system 1 according to the current exemplary embodiment includes a network server 100, a camera 10, a recorder 20, a monitoring device 30, a central management device 40, a manager terminal 300, and a network 200 through which these devices are connected to each other.

When positions of the camera 10, the recorder 20, the monitoring device 30, the central management device 40, and the like are determined in a spatial unit to which the network security system 1 is applied, the network server 100 according to the current exemplary embodiment automatically configures (i.e., sets) the settings of the corresponding devices, which will be described later.

The camera 10 is a device which acquires an image. According to an exemplary embodiment, the camera 10 may be an IP camera. The camera 10 may acquire an image in real time and transmit the image to the recorder 20.

In the current exemplary embodiment, the network security system 1 may be a security system that is applied to one spatial unit. For example, in the current exemplary embodiment, the network security system 1 may be a security system that acquires security images from cameras, which are present within a single building, and stores, monitors, and retrieves the security images.

Although FIG. 1 shows that the network security system 1 includes one camera 10 for convenience of description, the network security system 1 may include a plurality of cameras 10. As described above, when a spatial unit to which the network security system 1 is applied is one building, the plurality of cameras 10 capable of acquiring images of all regions within the building in real time may be included.

In a security system of the related art, when the number of cameras 10 is increased, there is a problem in that a process of registering and installing many cameras by the central management device 40 or the recorder 20 is complicated. In addition, there is a problem in that it is difficult to recognize an erroneous installation situation. A method of remedying the above-described problems will be described later with reference to FIG. 3 and the subsequent drawings.

The recorder 20 is a device capable of receiving and storing an image captured by the camera 10. In the current exemplary embodiment, the recorder 20 may be a digital video recorder (DVR) that stores an analog image or may be a network video recorder (NVR) that receives a generated image from a network and stores the image.

The monitoring device 30 may be a viewer device including a display screen for monitoring images captured by the camera 10 in real time.

The central management device 40 is a device that allows a manager to view and manage images received from the camera 10 and images recorded in the recorder 20. In more detail, the central management device 40 receives images from the camera 10 in real time and retrieves and reproduces stored images. The central management device 40 may be a central monitoring system, or may be a personal computer that functions as the central monitoring system. However, any computing device capable of reproducing, retrieving, and managing images captured by the camera 10 may be used as the central management device.

A network switch 201 may be a device that functions as a switch or a hub between the camera 10, the recorder 20, the monitoring device 30, the central management device 40, and the network 200. The network switch 201 may be installed on a path through which the devices are connected to the network 200, or may be omitted.

The network 200 may be a wired/wireless communication network for connecting the camera 10, the recorder 20, the monitoring device 30, the central management device 40, the network switch 201, the network server 100, and the manager terminal 300. Any type of communication network capable of being applied to the network security system 1 may be used as the network 200.

For convenience of description, the camera 10, the recorder 20, the monitoring device 30, the central management device 40, the network 200, and the network switch 201 described above may be collectively referred to as the "device" or "devices" of the network security system 1.

The manager terminal 300 refers to a manager terminal including an input/output device that allows a manager (i.e., a user) to use information on the network security system 1. Any computing device including an input/output device may be used as the manager terminal 300. According to the current exemplary embodiment, the manager terminal 300 is a terminal capable of installing a software program or an application provided by the network server 100. A manager may browse information provided by the network server 100 or inputs information and transmits the information to the network server 100 by using the manager terminal 300.

According to the current exemplary embodiment, a manager may input data necessary for the network security system 1. For example, spatial information and data related to positions of the camera 10, the recorder 20, the monitoring device 30, the central management device 40, and the network 200, by using the manager terminal 300. In addition, the manager may select types of the camera 10, the recorder 20, the monitoring device 30, and the central management device 40, which are to be installed in the network security system 1, by using the manager terminal 300. In this specification, expressions of "input by a manager" may be understood as being input through the manager terminal 300.

Figure 2:
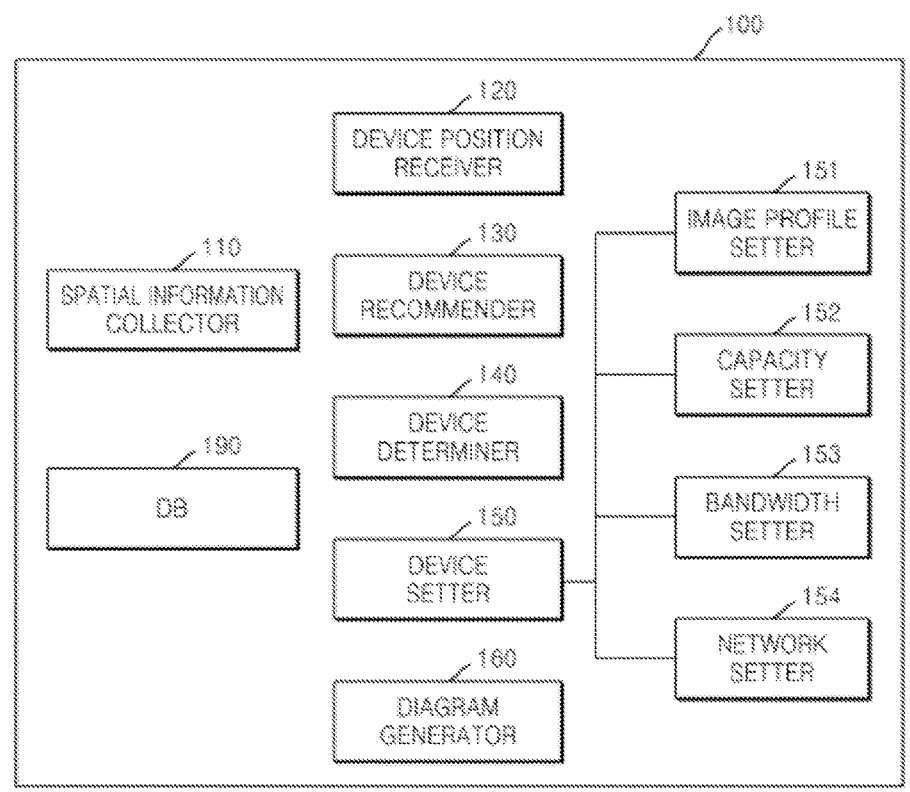
FIG. 2 is a block diagram showing an internal configuration of a network server according to an exemplary embodiment.

FIG. 2 is a diagram showing an internal configuration of the network server 100 according to an exemplary embodiment.

Referring to FIG. 2, the network server 100 according to an exemplary embodiment includes a spatial information collector 110, a device position receiver 120, a device recommender 130, a device determiner 140, a device setter 150, a diagram generator 160, and a database 190. Functions provided by the network server 100 may be realized as applications or software and may be provided to the manager terminal 300. The network server 100 may further include at least one of a processor, such as a center processing unit (CPU) and a microprocessor, a hardware module, or a circuit to perform the functions provided by the network server 100.

Another exemplary embodiment may disclose that any of the collector 100, the device position receiver 120, the device recommender 130, the device determiner 140, the device setter 150, and the diagram generator 160 may include at least one of a processor, a hardware module, or a circuit for performing their respective functions.

First, the spatial information collector 110 receives information about a space to which the network security system 1 is applied, from the manager terminal 300. According to an exemplary embodiment, the spatial information collector 110 may receive a design drawing file of the space to which the network security system 1 is applied (e.g., a floor plan), from a manager. At this time, the spatial information collector 110 may acquire information about the space to which the network security system 1 is applied, by using the internal design drawing file.

For example, assuming that the space to which the network security system 1 is applied is the inside of a specific building, the spatial information collector 110 may receive an internal design drawing file of the specific building from a manager. The spatial information collector 110 may receive the internal design drawing file to thereby acquire spatial information such as the size of a room, the position of a wall, the height of a ceiling, and the arrangement of obstacles. In another exemplary embodiment, in a case where the space to which the network security system 1 is applied is an external space, the spatial information collector 110 may acquire spatial information from the manager terminal 300.

Figure 3:
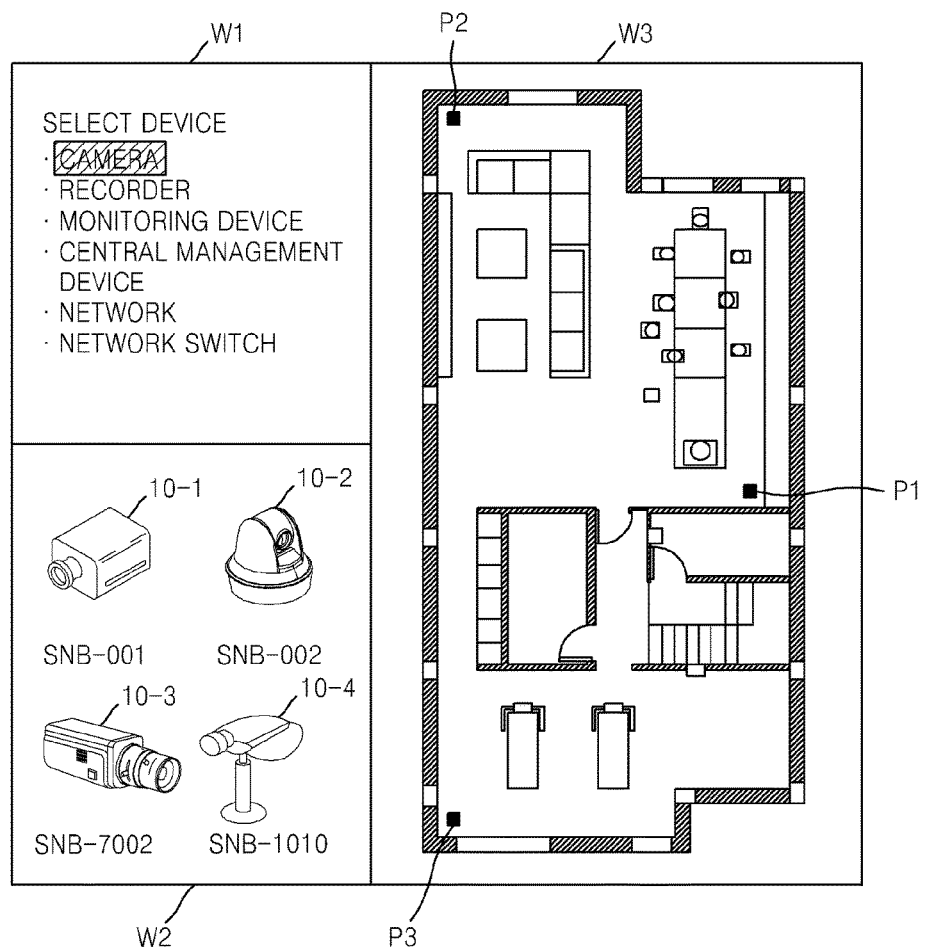
FIGS. 3 and 4 are diagrams showing a manager interface provided by the network security system, according to an exemplary embodiment.

According to an exemplary embodiment, the spatial information collector 110 may receive an input of data by which spatial information such as a CAD file may be directed and recognized, from the manager terminal 300. When the spatial information collector 110 acquires additional information about the space together with the CAD file, the spatial information collector 110 may acquire various other pieces of information about the space by analyzing the corresponding data. For example, the spatial information collector 110 may analyze and acquire information about the size of a room, the height of a wall dividing a section of the space, and the type of an obstacle which is present in the space, as shown in FIG. 3.

According to an exemplary embodiment, when a manager designates positions at which the devices constituting the security network system 1, that is, the camera 10, the recorder 20, the monitoring device 30, the central management device 40, the network 200, and the network switch 201, are to be installed, settings related to the devices may be automatically performed. In more detail, when a manager designates the positions at which the devices are to be installed, on the basis of the acquired spatial information, the network server 100 may provide a list of the devices that are suitable for the corresponding positions and receive a signal for selecting the devices from the manager to thereby automatically apply the settings of the selected devices. Hereinafter, roles of the device position receiver 120, the device recommender 130, the device determiner 140, and the device setter 150 will be described with respect to the camera 10 as an example.

The device position receiver 120 receives an input corresponding to the position at which the camera 10 is to be installed, from the manager terminal 300, on the basis of the acquired spatial information. For example, the device position receiver 120 may receive the position at which the camera is to be installed, from the manager terminal 300, on the basis of the internal design drawing of the building, which is received as the spatial information. At this time, the number of positions at which the cameras are installed may be two or more. When the range of the space to which the network security system 1 is applied is wide or when a wall or an obstacle is present in the space, a plurality of cameras may be necessary to monitor the entire space. Accordingly, the device position receiver 120 may receive a plurality of positions at which the cameras may be installed.

According to an exemplary embodiment, a manager may directly designate a position at which the camera 10 is to be installed, by using the manager terminal 300. The network server 100 may display spatial information, which is received from the manager, on the manager terminal 300, and may provide an interface capable of displaying the position at which the camera 10 is installed on the spatial information. For example, when the spatial information received from the manager is an internal design drawing, the network server 100 may provide an interface capable of inputting the position at which the camera 10 is installed on the corresponding design drawing. When the manager displays one or more positions at which the camera 10 is installed, the device position receiver 120 may match the position at which the camera 10 is installed with the spatial information and store the matching of the position and the information.

In addition, according to an exemplary embodiment, the position of the camera 10, which is received by the device position receiver 120, may not only be a physical position, but may also be a position related to a connection relationship between the camera 10 and other devices. For example, the device position receiver 120 may receive an input of information regarding which monitoring device 30 the camera 10 is connected to, from the manager terminal 300, and may store the information, which is related to the designation of a position at which the network 200 is to be installed. That is, a manager may input the position at which the network 200 is to be installed as a position at which the specific camera 10 and the specific monitoring device 30 are to be connected to each other. In this case, the device position receiver 120 sets the installation position of the specific camera 10 to be connected to the specific monitoring device 30.

Figure 4:
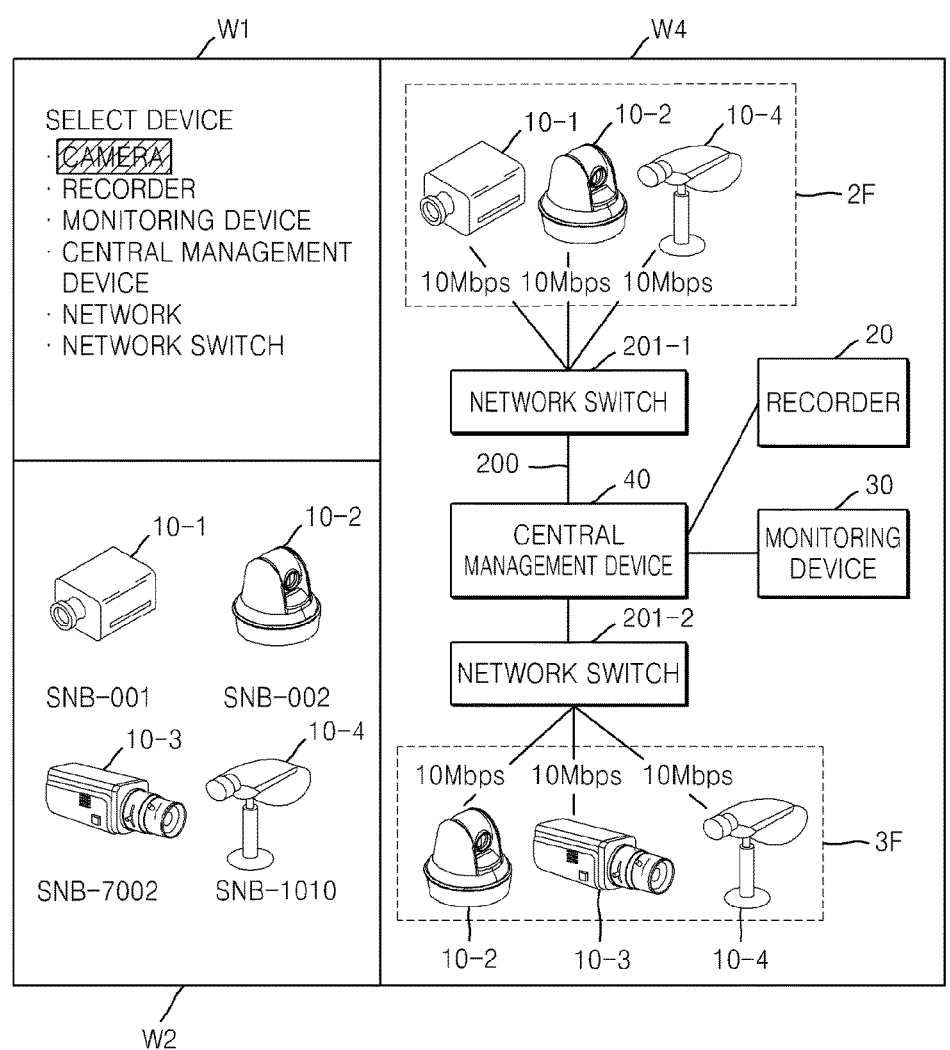

FIG. 3 and FIG. 4 are diagrams showing a manager interface provided by the network security system 1, according to an exemplary embodiment.

FIG. 3 shows an example of a software screen provided to the manager terminal 300 in the network security system 1 according to an exemplary embodiment. The software screen shown in FIG. 3 is for the purpose of illustrating a characteristic configuration of an exemplary embodiment. For convenience of description, only parts of the screen which are necessary for illustration are selectively shown.

The software screen shown in FIG. 3 is divided into three regions, including a device selection window w1, a device list window w2, and a spatial information window w3, respectively.

First, spatial information received from the manager terminal 300 may be displayed on the spatial information window w3. Referring to FIG. 3, an internal design drawing received from the manager terminal 300 may be displayed on the spatial information window w3. A manager may select a device to be installed on the device selection window w1 by using the manager terminal 300. Referring to FIG. 3, it is seen that the manager selects the camera 10.

Thereafter, the manager may designate a position at which the camera 10 is to be installed, on the spatial information window w3. In the example shown in FIG. 3, it is seen that the manager designates installation positions of the camera 10 as positions P1, P2, and P3.

The device recommender 130 provides a list of candidate cameras corresponding to the installation positions of the camera in descending order of the degree of matching. According to an exemplary embodiment, among the plurality of models of the camera 10, a model suitable for each camera installation position may be present. For example, a pan tilt zoom (PTZ) camera is suitable for a space where many obstacles are present, and a wide-angle camera may be suitable for a case where a wide space is monitored using one camera. The device recommender 130 may calculate the degree of matching between the installation position of the camera and the camera in consideration of characteristics of the installation position of the camera which is input from the manager terminal 300. The device recommender 130 may provide a list of candidate cameras suitable for the installation position of the camera in descending order of the degree of matching.

In more detail, the device recommender 130 may recommend a camera capable of monitoring 360-degrees such as a fisheye camera, as a camera which is installed at a place such as a lobby in a building. According to an exemplary embodiment, the device recommender 130 automatically recommends a camera which is suitable for visibility and an angle at which the lens thereof may perform imaging, by using drawing information corresponding to the building, among various models of the camera 10.

In addition, when an important facility or region is required to be monitored at night, the device recommender 130 may select a camera having an infrared (IR) function. In a place where temperature and humidity continuously change, the device recommender 130 may select a camera with an enhanced heater function. In a place such as a parking lot to which an external impact may be applied, the device recommender 130 may automatically recommend a Vandal camera having a strong resistance to an impact. According to the device determiner 140 to be described later, a manager may select an appropriate camera 10 among various recommended models of the camera 10 and may input installation information.

In addition, according to another exemplary embodiment, the device recommender 130 may provide all the cameras 10 registered in the database 190 in a recommendation list, regardless of the installation positions of the cameras.

Referring back to FIG. 3, the device list window w2 may be provided with a candidate camera list corresponding to the installation positions (P1, P2, and P3) of the camera 10. According to the exemplary embodiment shown in FIG. 3, the shape and model of the corresponding camera may be displayed in the candidate camera list displayed on the device list window w2.

The device determiner 140 receives a signal for selecting one camera from the candidate camera list and determines a camera to be installed at a camera installation position. In the current exemplary embodiment, a manager may receive a camera installation position. According to another exemplary embodiment, the manager may input a camera installation position himself or herself, receive a camera recommendation list based on the camera installation position, and may select one camera from the camera recommendation list. According to an exemplary embodiment, the manager selects the camera 10 to be installed from the candidate camera list provided by the device recommender 130. Thus, there is a low possibility of incurring additional costs resulting from the installation of the camera 10 that is unsuitable for the camera installation position and a further change of the camera.

Referring back to FIG. 3, a manager may select one camera 10 from the candidate camera list displayed on the device list window w2. The device determiner 140 may receive a signal for selecting a camera from the manager terminal 300 and may determine a camera to be installed.

The device setter 150 completes a setting of a device selected by a manager. The device setter 150 may include an image profile setter 151, a capacity setter 152, a bandwidth setter 153, and a network setter 154.

The image profile setter 151 of the device setter 150 may set a resolution, a frame rate, and a bitrate of an image, which are image profile settings of a camera. According to an exemplary embodiment, the image profile settings of the installed camera 10 are automatically completed. Thus, it is possible to remove the inconvenience when a manager is required to directly input image profile settings of all cameras.

At this time, a camera setting may be determined in consideration of characteristics of a position at which the camera 10 is installed and characteristics of the network 200, the recorder 20, the monitoring device 30, or the central management device 40 which is connected to the camera 10. For example, when the recorder 20 connected to the camera 10 may record only a low-resolution image, in spite of the camera 10 selected by a manager being a device capable of capturing a high-resolution image, an image profile of the camera 10 may be set to a low resolution.

In the related art, when a security system for a specific space is constructed, a manager installs cameras and then directly performs image profile settings of the installed cameras on the individual cameras. In this case, due to a small security region, there is no problem when several tens of cameras are present. However, in recent years, as the size of a security system has become larger, there is an inconvenience in that it takes a long time to perform a camera setting when several hundreds of cameras managed by a security system are present. According to an exemplary embodiment, when a manager designates a camera selection position and selects a camera from a camera recommendation list, characteristics of a space are automatically reflected, and thus the image profile settings are completed. Accordingly, it is possible to easily design the entire network security system.

According to another exemplary embodiment, the device setter 150 may receive a signal from the manager terminal 300 and may change the camera setting. That is, the device setter 150 may automatically complete an image profile setting of the camera 10, but may also change the image profile setting of the camera 10 according to an input by a manager.

The capacity setter 152 of the device setter 150 sets a storage space and capacity of the recorder 20 or the monitoring device 30. In addition, the bandwidth setter 153 of the device setter 150 sets a network bandwidth between devices connected to each other. The network setter 154 of the device setter 150 completes network settings related to a dynamic host configuration protocol (DHCP), a static IP, a dynamic domain name service (DDNS), and the like.

In the above-described example, the operations of the device position receiver 120, the device recommender 130, the device determiner 140, and the device setter 150 of the camera 10 have been described. However, the same setting may also be applied to the recorder 20, the monitoring device 30, the central management device 40, the network 200, and the network switch 201, which are other devices of the network security system 1.

For example, the device position receiver 120 receives a position at which the recorder 20 is installed from the manager terminal 300 and recommends the recorders 20 capable of being installed at the corresponding installation position. The device determiner 140 receives a signal for determining the recorder 20 from the manager terminal 300 to determine the recorder 20 which is installed at the corresponding installation position. Thereafter, the capacity setter 152 of the device setter 150 may determine the number of storage spaces (HDD), capacity, and storable period of the corresponding recorder 20 in consideration of the position of the recorder 20 to be installed, characteristics of the camera 10 to be connected, and the network 200.

Alternatively, the device position receiver 120 receives a position at which the monitoring device 30 is installed from the manager terminal 300, the device recommender 130 recommends the monitoring devices 30 capable of being installed at the corresponding installation position, and the device determiner 140 receives a signal for determining the monitoring device 30 from the manager terminal 300 to determine the monitoring device 30 which is installed at the corresponding installation position. Thereafter, the capacity setter 152 of the device setter 150 may determine the number of storage spaces (HDD), capacity, and storable period of the monitoring device 30 in consideration of the position of the monitoring device 30 to be installed and characteristics of the camera 10, which is connected to the network 200, and the network 200.

Alternatively, the device position receiver 120 receives a position at which the central management device 40 is installed from the manager terminal 300, the device recommender 130 recommends central management devices 40 capable of being installed at the corresponding installation position, and the device determiner 140 receives a signal for determining the central management device 40 from the manager terminal 300 to determine the central management device 40 which is installed at the corresponding installation position. The device setter 150 may store settings for the central management device 40 in consideration of the position of the central management device 40 and characteristics devices, which are connected to the network 200, and the network 200.

Alternatively, the device position receiver 120 receives a connection relationship of the network 200 from the manager terminal 300, and the device recommender 130 recommends the network 200 capable of being installed for the corresponding connection relationship and receives a signal for determining the network 200 from the manager terminal 300 to determine the network 200 which is installed for the corresponding connection relationship. Thereafter, the bandwidth setter 153 of the device setter 150 may set a bandwidth of the network 200 in consideration of characteristics and the like of devices connected to the network 200.

However, for devices other than the camera 10, the device position receiver 120 may not receive an input of an installation position depending on characteristics of the devices, and the device recommender 130 may provide a list of the devices registered in the database 190, regardless of positions. This is because for the devices other than the camera 10, their connection relationship is important, when the devices of the network security system 1 are connected to the network 200, whereas a real installation position may not be important.

For example, it is important whether the recorder 20, the monitoring device 30, the central management device 40, the network 200, and the network switch 201 are connected to a certain camera 10 or other devices, and a real installation position may not be important. Accordingly, the device position receiver 120 may receive only information about the connection relationship, rather than a real installation position, from the manager terminal 300 and may store the received information. At this time, a manager may input the information about the connection relationship by using a diagram interface generated by the diagram generator 160 to be described later. In this case, the device recommender 130 may also provide all lists stored in the database 190 as recommended device lists, regardless of an installation position.

Next, the diagram generator 160 generates a diagram with reference to a device installation position stored in the device position receiver 120, a device to be installed, which is determined by the device determiner 140, and device settings performed by the device setter 150. The diagram generated by the diagram generator 160 may be schematized so that a manager may easily ascertain the settings and the connection relationship between the devices of the network security system 1.

Referring to FIG. 4, a connection relationship between devices of the network security system 1 is shown on a diagram display window w4. In the diagram display window w4 shown in FIG. 4, three cameras 10 may be connected to the network switch 201, and the network switch 201 may be connected to the central management device 40.

As described above, the device determiner 140 receives a signal for selecting a device from a manager to determine the device to be installed at an installation position. For example, when a manager inputs a second floor (2F), which is spatial information, as a device installation position and selects a first camera 10-1 from a candidate device list (list displayed on w2), the device setter 150 automatically completes an image profile setting. When a manager performs the same input on a second camera 10-2 and a fourth camera 10-4, the diagram display window w4 of FIG. 4 displays the first camera 10-1, the second camera 10-2, and the fourth camera 10-4 being installed on the second floor (2F).

Next, a manager may select the network switch 201 on the device selection window w1 and may select any one of the models of the network switch 201 which are displayed on the device list window w2 to install a first network switch 201-1. In addition, the manager may select the network 200 on the device selection window w1 and may select any one of the models of the network 200 which are displayed on the device list window w2 to install the network 200 so that the first camera 10-1, the second camera 10-2, and the fourth camera 10-4 are connected to the first network switch 201-1. In the example of the diagram shown in FIG. 4, elements shown by a solid line refer to the network 200. When the manager selects devices by using the above-described method and then designates a connection relationship and installation positions of the devices, the device setter 150 may automatically complete the settings of the devices.

For example, the network server 100 may receive the selected positions of the second camera 10-2, the third camera 10-3, and the fourth camera 10-4 from a manager to designate the cameras 10 to be installed on a third floor (3F). When the cameras 10 to be installed are designated, the device setter 150 may automatically store the image profile settings of the cameras 10 in a similar manner. For example, the bandwidth setter 153 may automatically calculate a bandwidth of the network 200. FIG. 4 shows an exemplary embodiment in which a bandwidth between the first, second, and fourth cameras 10-1, 10-2, and 10-4 installed at the second floor and the first network switch 201-1 is determined to be 10 MBps.

In addition, the manager may select the network 200, the network switch 201, the recorder 20, the monitoring device 30, and the central management device 40 to designate installation positions according to the connection relationship with the cameras 10. The connection relationship and the installation positions of the devices may be shown by a diagram on the diagram display window w4, as shown in FIG. 4.

As shown in FIG. 4, the manager may connect the first network switch 201-1 to the cameras 10 installed on the second floor (2F) and a second network switch 201-2 to the cameras 10 installed on the third floor (3F), may connect the central management device 40 between the network switches 201, and may connect the recorder 20 and the monitoring device 30 to the central management device 40. At this time, the connection relationship may be defined by selecting and adding the network 200 among the devices.

Finally, the database 190 may store various pieces of information which are collected, generated, and managed by the network security system 1. In more detail, the database 190 may store devices capable of being used in the network security system 1, positions of the devices, a connection relationship between the devices, settings of the devices, generated diagram information, and the like. Although FIG. 2 shows that the database 190 is configured to be included in the network server 100, the database 190 may be configured to be separate from the network server 100.

Figure 5:
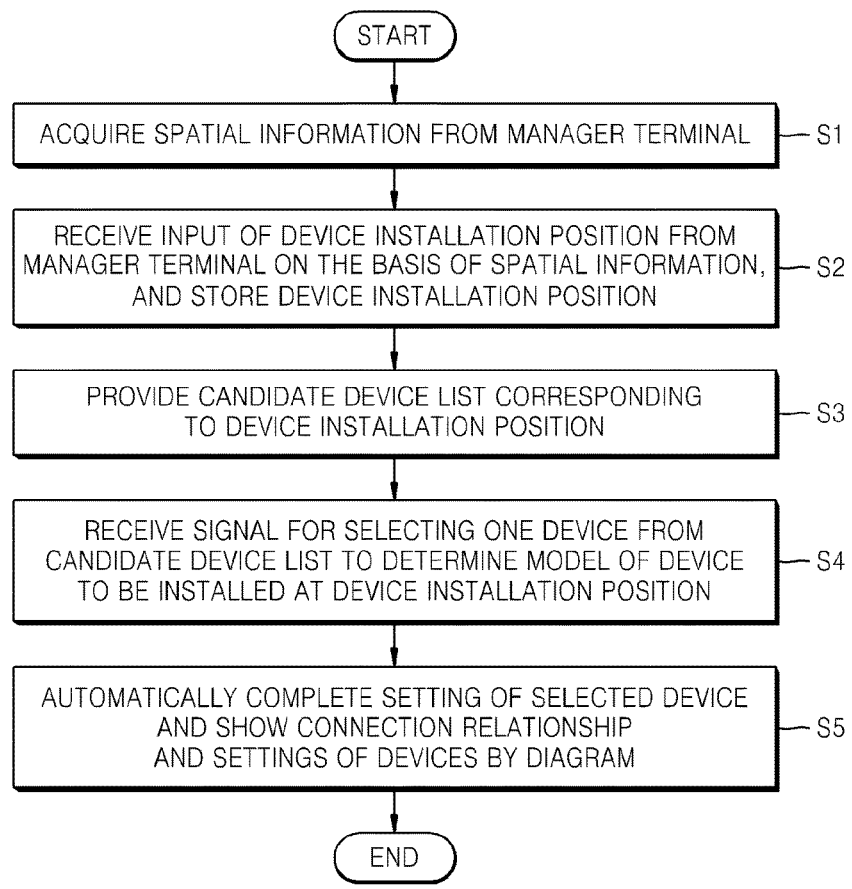
FIG. 5 is a flowchart showing an operation sequence of the network security system according to an exemplary embodiment.

FIG. 5 is a flowchart showing an operation sequence of the network security system according to an exemplary embodiment.

First, the spatial information collector 110 acquires spatial information from the manager terminal 300 (operation S1).

Next, the device position receiver 120 receives an input of a device installation position from the manager terminal 300 on the basis of the spatial information and stores the device installation position (operation S2).

Next, the device recommender 130 provides a candidate device list corresponding to the device installation position (operation S3).

Next, the device determiner 140 receives a signal for selecting one device from the candidate device list to determine a model of the device to be installed at the device installation position (operation S4).

Finally, a setting of the selected device is automatically completed, and a connection relationship and settings of the devices are shown by a diagram (operation S5).

As described above, according to the one or more of the above exemplary embodiments, it is possible to receive a position at which a camera is to be installed from a manager to thereby provide a camera recommendation list and to automatically complete settings of devices. Thus, even when a space to which a network security system is applied is increased, it is possible to efficiently design the network security system.

The exemplary embodiments described above may be recorded on a computer-readable recording medium in a manner of being implemented into a program command type executable by various computers including at least one processor. The computer-readable recording medium can store a program command, a data file, a data structure, or combinations thereof. The program command recorded in the computer-readable recording medium is specially designed and configured for the exemplary embodiment or can be known in public to those skilled in the field of software. For example, the computer-readable recording medium includes a magnetic medium such as a hard disk, a floppy disk, and a magnetic tape, an optical medium such as a CD-ROM and a DVD, a magneto-optical medium such as a floptical disk, or such a hardware device specially configured to store and execute a program command as ROM, RAM, a flash memory, and the like. For example, the program command includes machine code created by a compiler or high-level language code executable by a computer using an interpreter and the like. The hardware device can be configured to operate as at least one software module to perform an operation of the exemplary embodiments, and vice versa.

The particular exemplary embodiments shown and described herein are illustrative and are not intended to otherwise limit the scope of the inventive concept, as defined by the appended claims. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the exemplary embodiments unless the element is specifically described as "essential" or "critical".

The use of the terms "a", "an", and "the" and similar referents in the context of describing the exemplary embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The exemplary embodiments are not limited to the described order of the steps. The use of any and all examples, or exemplary language (e.g., "such as") provided herein, is intended merely to better illuminate the exemplary embodiments and does not pose a limitation on the scope of the inventive concept, as defined by the appended claims. Numerous modifications and adaptations will be readily apparent to those skilled in this art without departing from the spirit and scope of the inventive concept, as defined by the appended claims.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept, as defined by the appended claims.

What is claimed is:

1. A network security system comprising one or more processors implementing:
    a spatial information collector configured to acquire spatial information about a space where the network security system is to be installed;
    a diagram generator configured to generate a user interface, the user interface comprising at least three separate windows of a spatial information window, a device selection window, and a device list window, the spatial information window displaying the spatial information, the device selection window displaying a plurality of devices, and the device list window displaying a plurality of models of a given device;
    a device position receiver configured to receive a selection of a device among the plurality of devices in the device selection window, and receive at least one device installation position in the spatial information window, the at least one device installation position being a position at which the selected device is to be installed;
    a device recommender configured to, in response to receiving the selection of the device and the at least one device installation position, automatically display in the device list window, a list of candidate models of the selected device, the candidate models being determined based on a characteristic of the at least one device installation position;
    a device determiner configured to receive a selection of a model from the list of candidate models in the device list window; and
    a device setter configured to automatically determine an initial setting of the selected model in response to receiving the selection of the model from the list of candidate models, prior to installment of the device at the at least one device installation position,
    wherein the device position receiver is further configured to receive information of other devices, of the network security system, to be connected to the device at the at least one device installation position, the initial setting being determined based on the at least one device installation position and characteristics of the device and the other devices, of the network security system, to be connected to the device, and
    wherein, when the device determiner receives the selection of the model from the list of candidate models in the device list window without designating the at least one device installation position, the spatial information window displays the at least one device installation position corresponding to the selected model.

2. The network security system of claim 1,
    wherein the device corresponding to the selected model is one of a camera, a recorder, a monitoring device, and a central management device.

3. The network security system of claim 2, wherein the list of candidate models comprises all models of corresponding devices that are stored in a database.

4. The network security system of claim 1, wherein the device setter is further configured to set at least one of an image profile, capacity, bandwidth, and network according to the initial setting of the device.

5. The network security system of claim 4, wherein in response to the device corresponding to the selected model being a camera, the device setter is further configured to set the image profile by setting a resolution, a bitrate, and a frame rate of the camera.

6. The network security system of claim 4, wherein in response to the device corresponding to the selected model being a recorder or a monitoring device, the device setter is further configured to set the capacity by setting a number of hard disks and capacity of the recorder or the monitoring device.

7. The network security system of claim 4, wherein in response to the device corresponding to the selected model being a network, the device setter is further configured to set a dynamic host configuration protocol (DHCP), a static Internet protocol (IP), and a dynamic domain name service (DDNS) of the network.

8. The network security system of claim 4, wherein in response to the device corresponding to the selected model being a network or a network switch, the device setter is further configured to set the bandwidth between devices connected to each other.

9. The network security system of claim 1, wherein the device recommender is further configured to provide the list of candidate models in descending order of a degree of matching between the candidate models and the at least one device installation position.

10. The network security system of claim 9, wherein the device recommender is configured to obtain the degree of matching by determining whether each of the candidate models is suitable for the at least one device installation position in consideration of the characteristic of the at least one device installation position.

11. The network security system of claim 1, wherein the device setter is further configured to change the initial setting of the device corresponding to the selected model based on an external input.

12. The network security system of claim 1, wherein at least two device installation positions are present with respect to at least one device which has at least one model.

13. The network security system of claim 1, wherein the device setter automatically determines a low resolution of the device in response to a low resolution of another device, of the network security system, to be connected to the device.

14. The network security system of claim 13, wherein the device is a camera and the another device is a recorder, and the device setter automatically determines a low resolution of the camera based on a low-resolution recording capacity of the recorder.

15. A network security method comprising:
acquiring spatial information about a space where a network security system is to be installed;
generating a user interface, the user interface comprising at least three separate windows of a spatial information window, a device selection window, and a device list window, the spatial information window displaying the spatial information and the device selection window displaying a plurality of devices;
receiving a selection of a device among the plurality of devices in the device selection window;
receiving at least one device installation position in the spatial information window, the at least one device installation position being a position at which the selected device is to be installed;
in response to receiving the selection of the device and the at least one device installation position, automatically displaying in the device list window, a list of candidate models of the selected device, the candidate models being determined based on a characteristic of the at least one device installation position;
receiving a selection of a model from the list of candidate models; and
automatically determining an initial setting of the selected model in response to receiving the selection of the model from the list of candidate models, prior to installment of the device at the at least one device installation position,
wherein the network security method further comprises receiving information of other devices, of the network security system, to be connected to the device at the at least one device installation position, the initial setting being determined based on the at least one device installation position and characteristics of the device and the other devices, of the network security system, to be connected to the device, and
wherein, when the selection of the model is received from the list of candidate models in the device list window without designating the at least one device installation position, the spatial information window displays the at least one device installation position corresponding to the selected model.

16. The network security method of claim 15,
wherein the device corresponding to the selected model is one of a camera, a recorder, a monitoring device, and a central management device, and
wherein the network security method further comprises setting at least one of an image profile, capacity, bandwidth, and network according to the initial setting of the device.

17. The network security method of claim 16, wherein the image profile includes at least one of a resolution, a bitrate, and a frame rate.

18. A network security method comprising:
acquiring spatial information about a space where a security system is to be installed;
generating a user interface, the user interface comprising at least three separate windows of a spatial information window, a device selection window, and a device list window, the spatial information window displaying the spatial information and the device selection window displaying a plurality of devices;
receiving a selection of a device among the plurality of devices in the device selection window;
receiving at least one device installation position in the spatial information window, the at least one device installation position being a position at which the selected device is to be installed;
in response to receiving the selection of the device and the at least one device installation position, automatically displaying in the device list window, a list of candidate models of the selected device, the candidate models being determined based on a characteristic of the at least one device installation position;
receiving a selection of a model from the list of candidate models; and
automatically determining an initial setting of the selected model in response to receiving the selection of the model from the list of candidate models, prior to installment of the device at the at least one device installation position, the initial setting being determined based on the characteristic of the at least one device installation position,
wherein, when the selection of the model is received from the list of candidate models in the device list window without designating the at least one device installation position, the spatial information window displays the at least one device installation position corresponding to the selected model.

19. The network security method of claim 18, wherein the automatically configuring the setting of the device comprises automatically configuring the setting of the device based on the at least one device installation position and characteristics of the device and other devices, of the security system, to be connected to the device.

20. The network security method of claim 18, wherein the device corresponding to the selected model is one of a camera, a recorder, a monitoring device, and a central management device.

21. The network security method of claim 18, wherein the network security method further comprises setting at least one of an image profile, capacity, bandwidth, and network according to the setting of the device.

22. The network security method of claim 21, wherein the image profile comprises at least one of a resolution, a bitrate, and a frame rate of the device.

* * * * *